(12) United States Patent  
Alexander

(10) Patent No.: US 8,531,858 B2  
(45) Date of Patent: Sep. 10, 2013

(54) POWER CONVERSION WITH CURRENT SENSING COUPLED THROUGH SATURATING ELEMENT

(75) Inventor: William C. Alexander, Spicewood, TX (US)

(73) Assignee: Ideal Power, Inc., Spicewood, TX (US)

( * ) Notice: Subject to any disclaimer, the term of this patent is extended or adjusted under 35 U.S.C. 154(b) by 3 days.

(21) Appl. No.: 13/400,567

(22) Filed: Feb. 20, 2012

(65) Prior Publication Data

US 2012/0268975 A1 Oct. 25, 2012

Related U.S. Application Data

(60) Provisional application No. 61/444,385, filed on Feb. 18, 2011.

(51) Int. Cl.
*H02M 7/5387* (2007.01)

(52) U.S. Cl.
USPC ............................. 363/132; 363/124; 363/131

(58) Field of Classification Search
USPC ................. 324/207.15; 363/13, 17, 124, 16, 363/123, 34, 36, 131, 132
See application file for complete search history.

(56) References Cited

U.S. PATENT DOCUMENTS

| | | |
|---|---|---|
| 4,068,277 A | 1/1978 | Simokat |
| 4,331,994 A | 5/1982 | Wirth |
| 4,616,300 A | 10/1986 | Santelmann, Jr. |
| 4,730,242 A | 3/1988 | Divan |
| 4,942,511 A | 7/1990 | Lipo et al. |
| 4,992,919 A | 2/1991 | Lee et al. |
| 5,010,471 A | 4/1991 | Klaassens et al. |
| 5,127,085 A | 6/1992 | Becker et al. |
| 5,189,603 A | 2/1993 | Sashida et al. |
| 5,208,740 A | 5/1993 | Ehsani |
| 5,363,020 A | 11/1994 | Chen et al. |
| 5,412,557 A | 5/1995 | Lauw |
| 5,500,791 A | 3/1996 | Kheraluwala et al. |
| 5,903,448 A | 5/1999 | Davila, Jr. |
| 5,977,569 A | 11/1999 | Li |
| 6,118,678 A | 9/2000 | Limpaecher et al. |
| 6,166,930 A | 12/2000 | Czerwinski |
| 6,195,505 B1 | 2/2001 | Van Alstyne |
| 6,226,162 B1 | 5/2001 | Kladar et al. |
| 6,330,170 B1 | 12/2001 | Wang et al. |
| 6,370,050 B1 | 4/2002 | Peng et al. |
| 6,404,654 B1 | 6/2002 | Wang |
| 6,424,133 B1 | 7/2002 | Choi |
| 6,459,606 B1 | 10/2002 | Jadric |

(Continued)

OTHER PUBLICATIONS

Chen, D. et al., "Novel Current Mode AC/AC Converters with High Frequency AC Link," Power Electronics Specialists Conference, 2005. PESC '05. IEEE 36th, pp. 39-44, Jun. 16, 2005. doi: 10.1109/PESC.2005.1581599 URL: http://ieeexplore.ieee.org/stamp/stamp.jsp?tp=&arnumber=1581599&isnumber=33408.

(Continued)

*Primary Examiner* — Gary L Laxton
*Assistant Examiner* — Kyle J Moody
(74) *Attorney, Agent, or Firm* — Robert O. Groover, III; Gwendolyn S. S. Groover; Groover & Associates PLLC

(57) ABSTRACT

An architecture for current-modulating power-handling circuits, such as power converters, where a small saturating inductance is used to obtain a pulse edge when the main current value crosses zero.

12 Claims, 5 Drawing Sheets

(56) References Cited

U.S. PATENT DOCUMENTS

| | | | |
|---|---|---|---|
| 6,567,278 B2 | 5/2003 | Rufer et al. | |
| 6,984,965 B2 | 1/2006 | Vinciarelli | |
| 6,995,992 B2 | 2/2006 | Wei et al. | |
| 7,042,199 B1 | 5/2006 | Birchenough | |
| 7,057,905 B2 | 6/2006 | Macmillan | |
| 7,312,593 B1 | 12/2007 | Streicher et al. | |
| 7,499,290 B1 | 3/2009 | Mazzola et al. | |
| 7,599,196 B2 * | 10/2009 | Alexander | 363/13 |
| 7,643,265 B2 | 1/2010 | Loader et al. | |
| 7,760,517 B2 | 7/2010 | Herty et al. | |
| 7,786,709 B2 | 8/2010 | Lawson et al. | |
| 8,107,267 B2 | 1/2012 | Tallam et al. | |
| 8,149,596 B2 | 4/2012 | Lee et al. | |
| 8,228,046 B2 * | 7/2012 | Ingemi et al. | 323/222 |
| 8,289,736 B2 | 10/2012 | Asplund | |
| 8,295,069 B2 * | 10/2012 | Alexander | 363/132 |
| 8,320,144 B2 * | 11/2012 | Lee | 363/89 |
| 2002/0059035 A1 | 5/2002 | Yagi et al. | |
| 2003/0122558 A1 | 7/2003 | Hacke | |
| 2003/0133317 A1 | 7/2003 | Norrga | |
| 2004/0080966 A1 * | 4/2004 | Chadwick et al. | 363/132 |
| 2005/0286271 A1 | 12/2005 | Vinciarelli | |
| 2006/0050538 A1 | 3/2006 | Scheel et al. | |
| 2006/0103341 A1 | 5/2006 | Steigerwald et al. | |
| 2007/0019451 A1 | 1/2007 | Bushnell | |
| 2007/0189044 A1 | 8/2007 | Liu et al. | |
| 2008/0013351 A1 | 1/2008 | Alexander | |
| 2008/0031019 A1 | 2/2008 | Alexander | |
| 2008/0049460 A1 | 2/2008 | Mohan et al. | |
| 2008/0147335 A1 | 6/2008 | Adest et al. | |
| 2008/0150484 A1 | 6/2008 | Kimball et al. | |
| 2008/0186742 A1 | 8/2008 | Seong | |
| 2009/0127448 A1 | 5/2009 | Fuyuki | |
| 2010/0046262 A1 * | 2/2010 | Wu | 363/126 |
| 2011/0012579 A1 | 1/2011 | Huang | |
| 2011/0057588 A1 | 3/2011 | Rineh et al. | |
| 2011/0085362 A1 * | 4/2011 | Bordin | 363/127 |
| 2011/0196629 A1 * | 8/2011 | Coutelou et al. | 702/62 |

OTHER PUBLICATIONS

Ehsani et al, "Inverse Dual Converter (IDC) for High-Power DC-DC Applications", IEEE Transactions on Power Electronics, vol. 8, No. 2, Apr. 1993, pp. 216-223.

Itoh, J. et al., "A novel control strategy for high-frequency AC-link AC/AC direct converter based on virtual converter system," Power Electronics and Applications, 2005 European Conference on, pp. 10 pp.-P.10, 2005. doi:10:1109/EPE.2005.219395 URL: http://ieeexplore.ieee.org/stamp/stamp.jsp?tp=&arnumber=1665585&isnumber=34861.

K. Ngo, "Topology and Analysis in PWM Inversion, Rectification, and Cycloconversion", Dissertation, California Institute of Technology (1984).

Kheraluwala, et al., "Performance Characterization of a High-Power Dual Active Bridge DC-to-DC Converter", IEEE Transactions on Industry Applications, vol. 28, No. 6, Nov./Dec. 1992, pp. 1294-1301.

Kim, et al., "New Bilateral Zero Voltage Switching AC/AC Converter Using High Frequency Partial-resonant Link", Korea Advanced Institute of Science and Technology, Industrial Electronics Society, 1990 IECON '90., 16th Annual conference of IEEE, pp. 857-862 vol. 2, Nov. 27-30, 1990 doi: 10.1109/IECON.1990.149252 URL: http://ieeexplore.ieee.org/stamp/stamp.jsp?tp=&arnumber=149252.

Sood, p. et al., "Power conversion distribution system using a high-frequency AC link," Industry Applications, IEEE Transactions on, vol. 24, No. 2, pp. 288-300, Mar./Apr. 1988 doi: 10.1109/28.2869 URL: http://ieeexplore.ieee.org/stamp/stamp.jsp?tp=&arnumber=2869&isnumber=164.

http://en.wikipedia.org/wiki/Push-Pull_Converter.

Yamamoto, S. et al., "Analysis of series-resonant AC link inverter for improving output current," Power Electronics Specialists Conference, PESC '94 Record, 25th Annual EIII, pp. 965-969 vol. 2, Jun. 20-25, 1994 doi: 10.1109/PESC.1994.373796 URL: http://ieeexplore.ieee.org/stamp/stamp.jsp?tp=&arnumber=373796&isnumber=8548.

* cited by examiner

POWER CONVERSION WITH CURRENT SENSING COUPLED THROUGH SATURATING ELEMENT

CROSS-REFERENCE

Priority is claimed from 61/444,385, filed Feb. 18, 2011, which is hereby incorporated by reference.

BACKGROUND

The present application relates to electric power conversion, and more particularly to circuits, methods and systems which use a smart current-modulating architecture, and most particularly to the detection of instants when power-carrying current crosses zero in power converters which use such an architecture.

Note that the points discussed below may reflect the hindsight gained from the disclosed inventions, and are not necessarily admitted to be prior art.

Numerous techniques have been proposed for electronic conversion of electric power from one form into another. A technique in common commercial usage for operating three phase induction motors at variable frequency and voltage off of fixed frequency and voltage utility power is the AC-DC-AC technique of the input diode bridge, DC-link capacitor, and the output active switch bridge, under pulse-width modulation (PWM) control. This motor drive technique ("standard drive") results in compact and low-cost motor drives, since no magnetic components are required and only six active switches are needed.

A number of difficulties exist with the standard drive, however. The input current, while nominally in phase with the input voltage, is typically drawn in pulses. These pulses cause increased electric losses in the entire electrical distribution system. The pulses also cause higher losses in the DC link capacitor. These losses reduce the efficiency of the drive, and also lessen the useful life of the DC link capacitor (commonly an aluminum electrolytic type), which has a limited life in any case. If the impedance of the source power is too low, the pulses may become so large as to be unmanageable, in which case it is necessary to add reactance in the input lines, which increases losses, size, cost, and weight of the drive. Also, the voltage available for the output section is reduced, which may lead to loss-producing harmonics or lower-than-design voltage on the output waveform when full power, full speed motor operation is called for.

The term "converter" is sometimes used to refer specifically to DC-to-DC converters, as distinct from DC-AC "inverters" and AC-AC "cycloconverters." However, in the present application the word converter is used more generally, to refer to all of these types and more, and especially to converters using a current-modulating architecture.

A new kind of current-modulating power converter was disclosed in U.S. Pat. No. 7,778,045, titled "Universal power conversion methods," the disclosure of which is incorporated by reference into the present application in its entirety. This patent describes a bidirectional (or multidirectional) power converter which draws power from the utility lines with low harmonics and unity power factor, is capable of operating with full output voltage even with reduced input voltage, allows operation of its switches with low stress during turn-off and turn-on, is inherently immune to line faults, produces voltage and current output waveforms with low harmonics and no common mode offsets while accommodating all power factors over the full output frequency range, operates with high efficiency, and which does so at a reasonable cost in a compact, light-weight package. This architecture has subsequently been referred to as a "current-modulating" architecture. Bidirectional power switches are used to provide a full bipolar (reversible) connection from each of multiple ports to an LC link reactance. Optimal timing of the switching, in such an architecture, is easier if the instantaneous current levels in the link inductor can be sensed accurately.

In previous implementations, estimation of current-zero-crossing can be implemented, for example, by shutting all switches, monitoring the voltage on the LC combination, and estimating that the peak voltage (due to the resonance of the inductor and capacitor) would correspond to the zero of the current. However, it was found that errors in peak detection would sometimes occur. These errors in peak detection may have been due to the electrically noisy environment in which power conversion circuits are often operated, but for whatever reason, such errors would sometimes occur. The consequence of such an error would be an error in switching optimization, which would propagate forward to further disturb efficient operation.

The present application discloses inventions which not only work synergistically with such architectures, but also have other advantageous uses.

BRIEF DESCRIPTION OF THE DRAWINGS

The disclosed inventions will be described with reference to the accompanying drawings, which show important sample embodiments and which are incorporated in the specification hereof by reference, wherein.

DETAILED DESCRIPTION OF SAMPLE EMBODIMENTS

The present application discloses new implementations for power conversion, as well as for current-modulating functions such as power-factor correction, motor drive, high-power audio-frequency and ultrasonic drive, etc. etc. The present application describes circuits, methods, and systems which advantageously use these innovations.

Numerous innovative teachings of the present application will be described with particular reference to presently preferred embodiments (by way of example, and not of limitation). The innovations described are not limited to any of these specific embodiments. The present application describes several inventions, and none of the statements below should be taken as limiting the claims generally.

A basic problem in sensing current, in a power-conversion circuit (or other circuit which handles large currents), is that normal sensing circuitry will not stand up to the voltages and currents on the power-conducting connection which needs to be monitored. For example, a power conversion circuit for a solar array for a commercial or industrial building may need to transfer tens or hundreds of kilowatts; a motor drive circuit for a simple off-the-shelf industrial motor may need to with-stand 1.414 times 480 (or 600) Volts, plus an allowance for transients. Any sensor design which requires any series resistance in the current transfer path will undesirably degrade efficiency. Simple magnetic coupling is sometimes used to sense AC current magnitudes, but typically imposes a phase shift which makes this unsuitable for current-zero-crossing detection.

Thus detection of current-zero-crossing is much more difficult than detection of voltage-zero-crossing.

The present application discloses power converters (or other smart power-handling electrical elements) in which a saturable sense inductor permits sensing of current-zero-crossing in the high-current lines of the link inductor. The sense inductor is preferably sized to saturate at a low enough energy input that it is not overheated, and energy efficiency of the converter is not degraded. This is especially advantageous in a smart current-modulating converter architecture.

Figure 1:
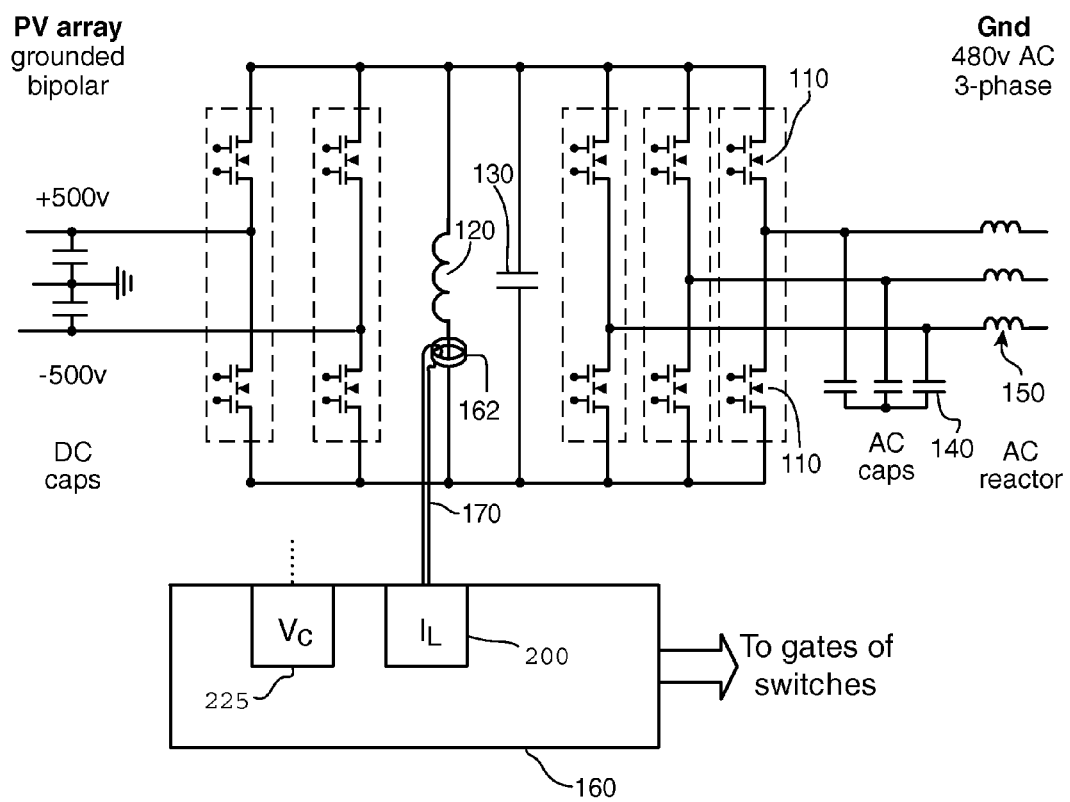
FIG. 1 is a schematic diagram of an exemplary power converter circuit.

FIG. 1 shows an example of a power converter which includes the disclosed inventions. Two bidirectional semiconductor switches 110 are used for each phase leg on input and output sides, so that each input or output terminal can be connected to either rail of the link reactance. The link reactance includes a power inductor 120 in parallel with a capacitor 130. The external terminal nodes are each preferably connected to a filter capacitor 140 and a series choke (inductor) 150.

In the solar inverter example described below, it is not strictly necessary to use fully bidirectional switches on the side which connects to DC. Instead, reverse-blocking semiconductor switches can be used on this side. However, fully bidirectional switches (such as back-to-back IGBTs) are preferably used for connection to the AC lines.

Control circuitry 160, implemented in this example as a field-programmable gate array, controls the switches 110 to determine the operation of the converter (as described below). A sense inductor 162 surrounds one lead of the link inductor, and a turn of sense wire around this sense inductor 162 is connected to zero current crossing detection circuitry. Inductor 162 has a small magnetic element, so it will saturate quickly each time the current changes sign.

Figure 2:
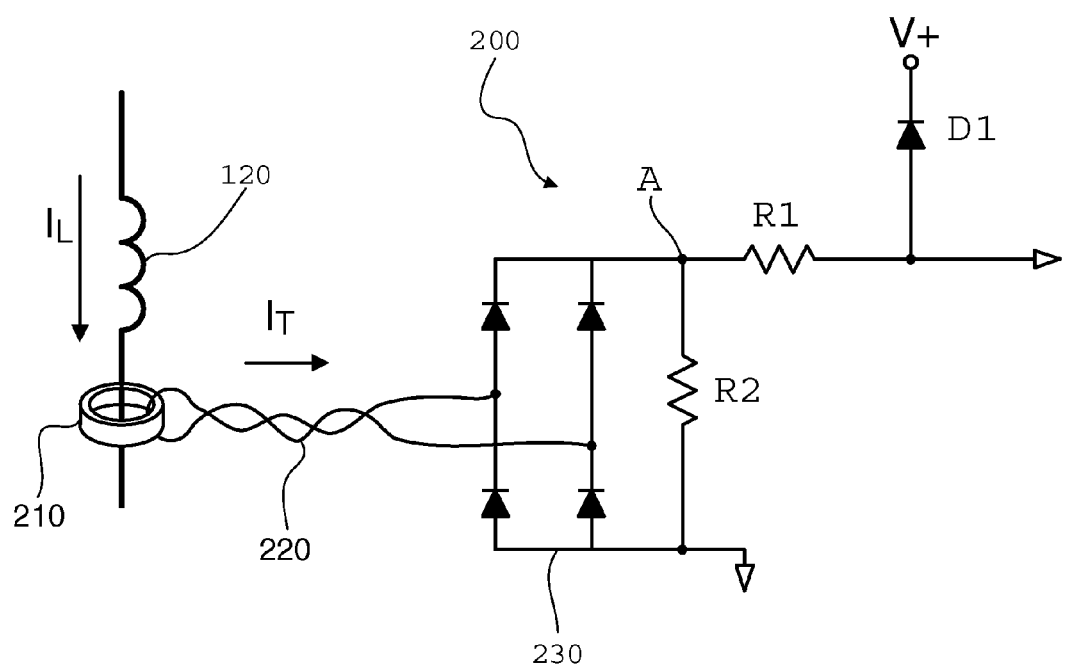
FIG. 2 is a schematic diagram of an embodiment of a zero-current crossing detector.

FIG. 2 shows a zero current crossing detection circuit 200 which is connected to the sense wires 170 from the sense inductor 162. This circuit will detect, accurately and with very low latency, when the direction of current changes in the link inductor 120. One lead of the link inductor is passed through a magnetic element 210, such as a ferrite toroid. (Alternately, the magnetic element can be constructed of another saturable magnetic material such as an iron-power composition.) One or more turns of a sense wire 220 are also passed through the toroid (210), and are terminated to the AC inputs of a full wave bridge rectifier 230. A suitable toroid 210 is the model MP2705P4AF, manufactured by Metglas, Inc.

Figure 3:
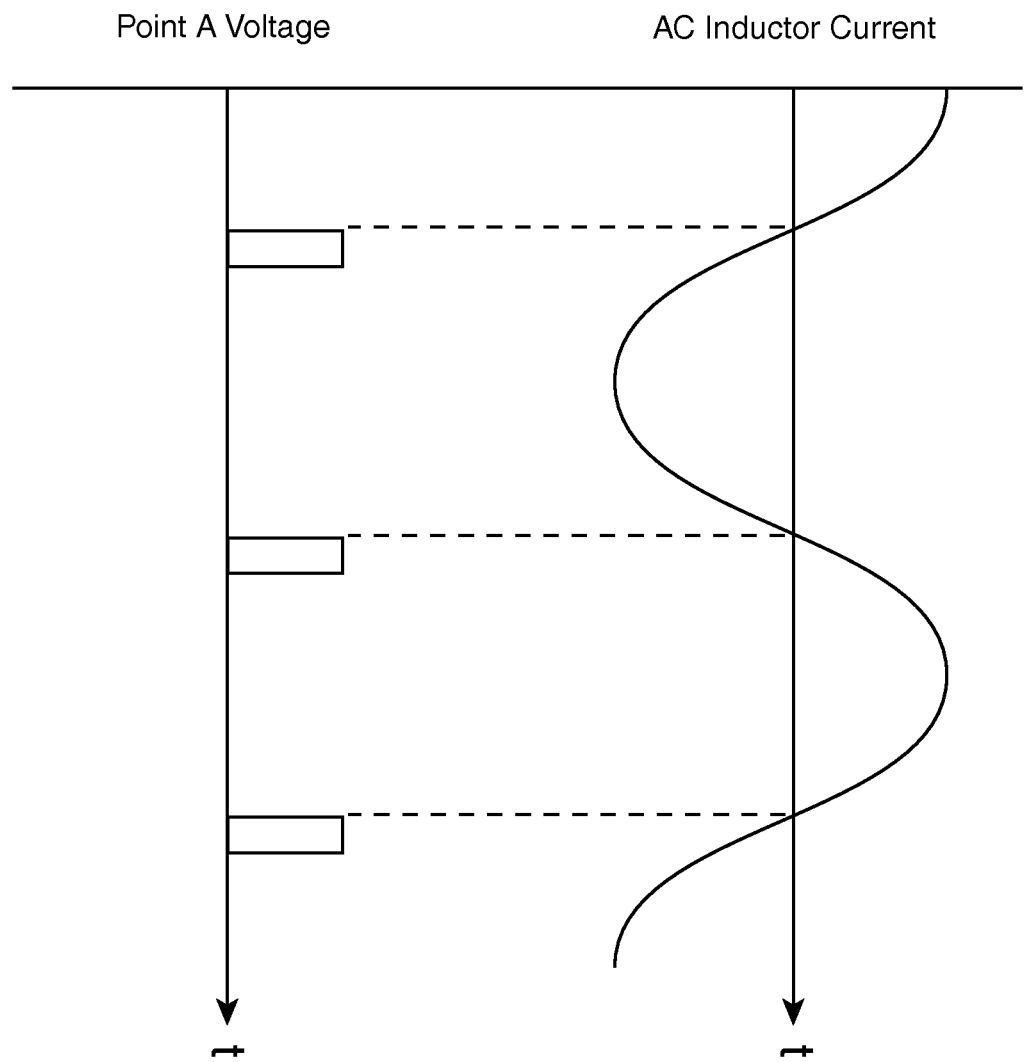
FIG. 3 is a timing diagram illustrating the timing relationships between inductor voltage and current, sensed current and detected voltage at the zero current crossing.

As the magnitude of the current in the AC inductor (120) increases from zero, the magnetic element 210 quickly saturates, and further increases in current do not cause a current in the sense wire 220. After the current in the inductor reverses and eventually passes through zero, the flux in the toroid 210 will reverse, and quickly saturate again in the opposite direction. This reversal will produce a voltage impulse on the sense lines 220. This impulse is rectified by the bridge rectifier 230, to produce one of the train of positive voltage pulses shown in FIG. 3. (Before rectification, the voltage impulses on the sense lines 220 will have alternating polarity.) In the circuit example shown, suitable values for R1 are about 50 ohms and for R2 about 200 ohms.

The leading edge of each pulse shows the instant of a current zero-crossing. The following Figure will show how this information is used.

Variable Switching Frequency

In the preferred system, the drive frequency on the link inductor varies dynamically. This is a distinctive feature of the smart current modulating architectures, and is an important difference from (for example) resonant converters. The disclosed current-sensing arrangement is particularly advantageous in current-modulating architectures which use variable switching frequency on the link inductor. However, the particular control relationship used in the preferred embodiment is not the only one which will result in a variable switching frequency on the link inductor.

In one example, with a 30 kW inverter which provides 3φ 480V AC power from a ±450V solar cell array, the link inductor is operated at 7 kHz at full power. (This frequency goes as high as 20 kHz as power drops to zero.) The power cycle frequency is twice this, or 14 kHz at full power, because there are two power transfers per link cycle.

At startup, the link inductor is started from two of the AC lines in the grid connection. Operation then starts at minimum power, and uses an MPPT (Maximum Power Point Transfer) technique to ramp up to max power for a given solar insolation.

In this example, the inverter is made to appear as a variable resistive load to the DC input, and the resulting power flow is apportioned among the lines of the three phase output to produce a current in those lines that is proportional to the line to neutral voltage, so as to achieve unity power factor and low harmonics. The value of this simulated resistance is simply set to the value which will maximize power transfer from the photovoltaic cells, and this is the MPPT technique.

To act as a resistive load, the controls use a conductance value that is varied in order to maximize the input power. (The current available from the photovoltaic array will vary with the amount of insolation, so the operating point can vary from time to time.)

From this conductance, and the input voltage, an input current command is calculated. This current command is integrated over a link power cycle to generate an input charge command, which determines the charge put in to driving the link inductor while it is attached to the input.

After the input charge is complete (for a given cycle of the link), the energy stored in the link is calculated, and apportioned among the AC output lines.

Since the line to neutral voltage for each AC line is externally determined by the frequency, phase, and nominal voltage of the grid, output current can be proportioned to these voltages. This provides a unity power factor source, which is advantageous.

Figure 4:
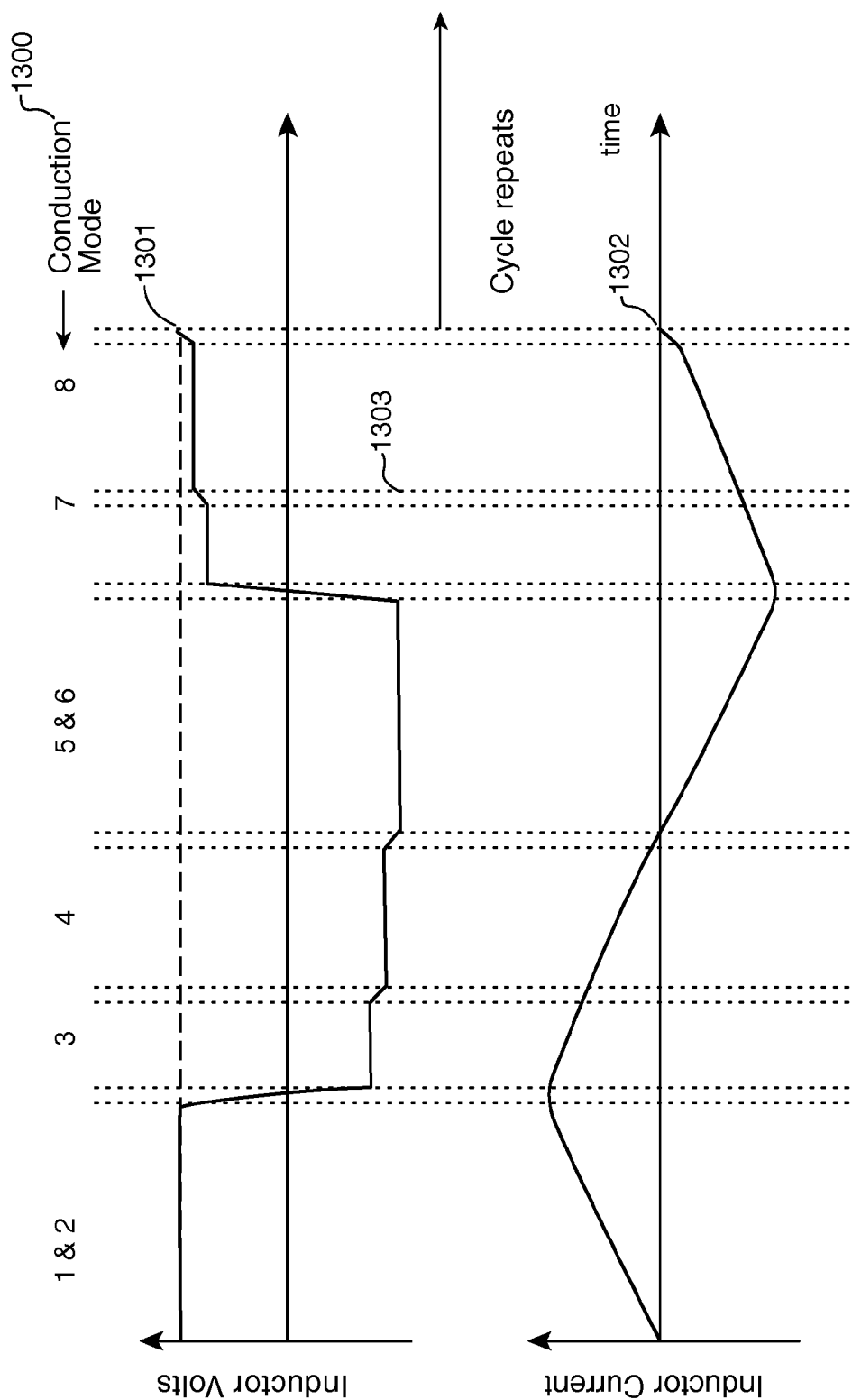
FIG. 4 shows an example of the switching stages during one full cycle of the link inductor.
Figure 5:
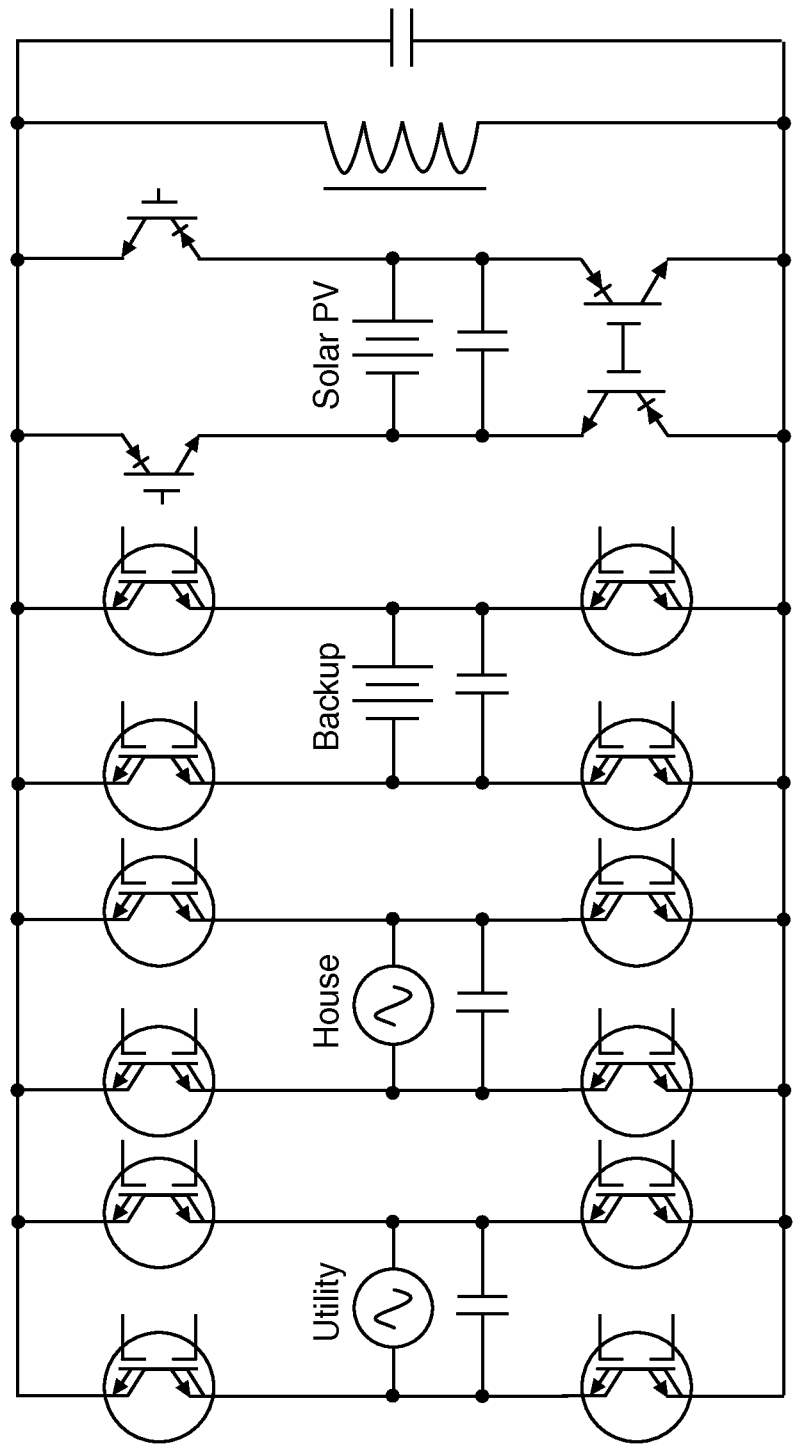
FIG. 5 shows an example of a complete photovoltaic power system which benefits from precise detection of current zero-crossings.

FIG. 4 shows an example of the switching stages during one full cycle of the link inductor. In Phase 1+2, voltage from the input is connected to ramp up the inductor current (and thus to pump energy into the inductor). (Phase 1+2 is just one phase in this example, but might be separated into two phases if the input is, for example, a three-phase line.) After Phase 1+2, an interphase $t_R$ follows, during which the combined inductor and capacitor are cut off from both input and output ports. During this interphase, the voltage on the inductor transitions relatively quickly, as the capacitor is charged. When the voltage on the inductor (and capacitor) matches that of the output line pair which is to be driven next, output-side switches are turned on to drive that line pair. At that point the current from the inductor flows to the output, and power is transferred.

In this example a three-phase output is provided, and Phase 3 and Phase 4 are used for driving two different output connections. (These are assumed to be two phases of a three-phase power output; the voltages of the phases in 60 Hz power lines will change at a rate which is insignificant in relation to the 7 kHz or more switching frequency of the link inductor.) Again, a short interphase is included between Phase 3 and Phase 4 to permit lossless voltage ramping.

The relative durations of Phases 3 and 4 are adjusted to provide the correct ratio of currents between those two output lines, to thereby provide unity power factor (current proportional to voltage).

Another interphase follows Phase 4. When the current in the inductor crosses zero, input side switches are turned on to begin Phase 5+6. (Like Phase 1+2, Phase 5+6 is a single phase in this example, but would be separated into more phases if a multiphase input were used.)

Note that the start of Phase 5+6 marks a transition from power extraction to power input. Where maximum power transfer is desired (as in typical operation of a solar array), it is advantageous to switch from output to input exactly when the inductor current crosses zero. This is shown, for example, at the start of Phase 5+6.

Sizing the Sense Inductor

The sense inductor will normally have an inductance which is a small fraction of the link inductor's. However, in the presently preferred implementation, the sense inductor's value is preferably at least 2% of the link inductor's. (Otherwise, when the circuit is lightly loaded, the sense inductor might not provide enough signal for the discrimination circuit to obtain an accurate zero crossing measurement.) However, this ratio is somewhat dependent on the particular discrimination circuit used, and on the expected range of operating conditions.

It is important to realize that the small-current inductance value is somewhat independent of the saturation characteristics of the sense inductor. The key function of the sense inductor is to provide the leading edge of a pulse when zero crossing occurs, and any power transfer beyond what is necessary for this is inconvenient. Therefore, the mass of this sense inductor is preferably very small.

In one example, where a 30 kW inverter converts power from a solar power system, the peak voltage on the link inductor at full power will be about 700V. The sense inductor used, in this example, is a ferrite toroid which is 1.5 inch outside diameter, 1 inch inside diameter, and about ¼ inch high. The saturation level of the sense inductor is such that its duty cycle is about 1%. One turn of wire, in this example, connects the sense inductor to the two inputs of the sensing circuit.

Preferably a voltage sensing input is also provided, but this is much simpler to implement. A resistive voltage divider can scale the 0-700V which appears on the link inductor down to levels convenient for an analog input, e.g. down to 0-14V.

The disclosed innovations, in various embodiments, provide one or more of at least the following advantages. However, not all of these advantages result from every one of the innovations disclosed, and this list of advantages does not limit the various claimed inventions.

Efficient power conversion;
Reduction in switching losses;
Reduction in the heat sinking requirements for a power circuit;
More accurate use of reactive link components.

According to some but not necessarily all embodiments, there is provided: 1. A current-modulating power converter comprising: a link reactance which includes an inductor and a capacitor in parallel; multiple switches operable to connect said inductor of said link reactance, with reversible polarity, to any selected one of multiple external connections; and control circuitry, connected through a saturable sense inductor to sense zero-crossings of current through said inductor of said link reactance; wherein said sense inductor saturates more than ten times as quickly as said inductor of said link reactance; and wherein said control circuitry controls operation of said switches in at least partial dependence on the output of said saturable sense inductor.

According to some but not necessarily all embodiments, there is provided: A current-modulating power converter comprising: a link reactance which includes an inductor and a capacitor in parallel; multiple switches operable to connect said inductor of said link reactance, with reversible polarity, to any selected one of multiple external connections; and control circuitry, connected through a saturable sense inductor to sense zero-crossings of current through said inductor of said link reactance; wherein said sense inductor is small enough to remain in saturation during more than 95% of the time, when the converter is operating at full power; and wherein said control circuitry controls operation of said switches in at least partial dependence on the output of said saturable sense inductor.

According to some but not necessarily all embodiments, there is provided: A method for power conversion, comprising: driving power, from at least one input connection, into a link inductor, to thereby flow current through said link inductor in a first direction with increasing magnitude; extracting power, from said link inductor to at least one output connection, while continuing the flow of current through said link inductor in said first direction, with decreasing magnitude; monitoring current flow through said link inductor using a saturable sense inductor, which saturates more than ten times as quickly as said link inductor; and when sense wire on said sense inductor provides a pulse showing that current on said link inductor has passed through zero, then driving power, from at least one input connection, into said link inductor, to thereby flow current through said link inductor in a second direction with increasing magnitude; and thereafter extracting power, from said link inductor to at least one output connection, while continuing the flow of current through said link inductor in said second direction, with decreasing magnitude.

According to some but not necessarily all embodiments, there is provided: A method for detecting the current zero-crossing in a current-modulating power converter, the power converter having a link reactance and multiple switches connected to drive current into or out of the link reactance, comprising: arranging a magnetic core to saturate when current passing through the link reactance rises up to a limit; rectifying voltage pulses occurring when current passing through the link reactance causes the magnetic core to pass out of and into saturation; and using the rectified voltage pulses to control the switches in at least partial dependence on the timing of the voltage pulses.

According to some but not necessarily all embodiments, there is provided: An architecture for current-modulating power-handling circuits, such as power converters, where a small saturating inductance is used to obtain a pulse edge when the main current value crosses zero.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

For one example, the current sensing element can alternatively be placed between the capacitor and a rail, instead of between the inductor and rail. In this case current measurement is performed during the interphase periods, when the combined inductor and capacitor are cut off from the input and output portals (and other portals if any).

For another example, the capacitor, although shown as a single capacitance, can be implemented by multiple capacitors connected in parallel. In such a case, the sense inductance can be positioned between just one capacitor and a rail, since the capacitors would be expected to share current in proportion to their sizes. This alternative can be attractive in very large units.

For another example, gain stages can optionally be included either before or after the diode bridge in the sensing circuit.

For another example, the disclosed inventions can be applied to embodiments, as shown in FIG. 28 of U.S. Pat. No. 7,599,196, where two LC circuits are used, and are operated out of phase with each other. In this case sense inductors are preferably present on BOTH of the link inductors.

For another example, it is normally sufficient to drive the two legs of a three-phase connection which have the highest voltage magnitudes; but alternatively it is also possible to drive or draw from all three phases on each cycle of the link reactance.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

Additional general background, which helps to show variations and implementations, as well as some features which can be synergistically with the inventions claimed below, may be found in the U.S. patent application Ser. Nos. 13/205,250, 13/205,212, and 13/205,225. All of these applications have at least some common ownership, copendency, and inventorship with the present application, and all of them are hereby incorporated by reference.

The claims as filed are intended to be as comprehensive as possible, and NO subject matter is intentionally relinquished, dedicated, or abandoned.

What is claimed is:

1. A current-modulating power converter comprising:
    a link reactance which includes an inductor and a capacitor in parallel;
    multiple switches operable to connect said inductor of said link reactance, with reversible polarity, to any selected one of multiple external connections; and
    control circuitry, connected through a saturable sense inductor to sense zero-crossings of current through said inductor of said link reactance; wherein said sense inductor saturates more than ten times as quickly as said inductor of said link reactance; and wherein said control circuitry controls operation of said switches in at least partial dependence on an output of said saturable sense inductor; and
    wherein said sense inductor is arranged to saturate when current passing through the link reactance rises up to a limit;
    wherein said sense inductor rectifies voltage pulses occurring when current passing through the link reactance causes the sense inductor to pass out of and into saturation; and
    wherein said sense inductor uses the rectified voltage pulses to control the switches in at least partial dependence on the timing of the voltage pulses.

2. The converter of claim 1, wherein said switches are all completely bidirectional.

3. The converter of claim 1, wherein said control circuitry controls operation of said switches to both drive energy into and extract energy from said inductor of said link reactance during each half-cycle of current flow in said inductor of said link reactance.

4. The converter of claim 1, wherein said control circuitry controls operation of said switches to change from extracting energy from said inductor of said link reactance, to driving energy into said link reactance, when current flow crosses zero, as indicated by the output of said saturable sense inductor.

5. The converter of claim 1, wherein said sense inductor saturates more than thirty times as quickly as said inductor of said link reactance.

6. A current-modulating power converter comprising:
    a link reactance which includes an inductor and a capacitor in parallel;
    multiple switches operable to connect said inductor of said link reactance, with reversible polarity, to any selected one of multiple external connections; and
    control circuitry, connected through a saturable sense inductor to sense zero-crossings of current through said inductor of said link reactance; wherein said sense inductor is small enough to remain in saturation during more than 95% of the time, when the converter is operating at full power; and wherein said control circuitry controls operation of said switches in at least partial dependence on an output of said saturable sense inductor;
    wherein said sense inductor is arranged to saturate when current passing through the link reactance rises up to a limit;
    wherein said sense inductor rectifies voltage pulses occurring when current passing through the link reactance causes the sense inductor to pass out of and into saturation; and
    wherein said sense inductor uses the rectified voltage pulses to control the switches in at least partial dependence on the timing of the voltage pulses.

7. The converter of claim 6, wherein said switches are all completely bidirectional.

8. The converter of claim 6, wherein said control circuitry controls operation of said switches to both drive energy into and extract energy from said inductor of said link reactance during each half-cycle of current flow in said inductor of said link reactance.

9. The converter of claim 6, wherein said control circuitry controls operation of said switches to change from extracting energy from said inductor of said link reactance, to driving energy into said link reactance, when current flow crosses zero, as indicated by the output of said saturable sense inductor.

10. The converter of claim 6, wherein said sense inductor saturates more than thirty times as quickly as said inductor of said link reactance.

11. The converter of claim 6, wherein said sense inductor is small enough to remain in saturation during more than 97% of the time, when said link reactance is operated at full power.

12. A method for power conversion, comprising:

driving power, from at least one input connection, into a link inductor, to thereby flow current through said link inductor in a first direction with increasing magnitude;

extracting power, from said link inductor to at least one output connection, while continuing the flow of current through said link inductor in said first direction, with decreasing magnitude;

arranging a magnetic core to saturate when current passing through the link reactance rises up to a limit;

rectifying voltage pulses occurring when current passing through the link reactance causes the magnetic core to pass out of and into saturation;

using the rectified voltage pulses to control switches in at least partial dependence on the timing of the voltage pulses;

when sense wire on said sense inductor provides a pulse showing that current on said link inductor has passed through zero, then driving power, from at least one input connection, into said link inductor, to thereby flow current through said link inductor in a second direction with increasing magnitude; and thereafter extracting power, from said link inductor to at least one output connection, while continuing the flow of current through said link inductor in said second direction, with decreasing magnitude.

* * * * *